United States Patent Office 2,813,810
Patented Nov. 19, 1957

2,813,810
SEPARATION OF D-GLUCOSE AND D-FRUCTOSE

Fred Smith, Wayzata, and David R. Spriestersbach, St. Paul, Minn., assignors to The Regents of the University of Minnesota, Minneapolis, Minn., a corporation of Minnesota No Drawing. Application June 1, 1954,
Serial No. 433,832

6 Claims. (Cl. 127—55)

This invention relates to the separation of D-glucose and D-fructose from invert sugar or sucrose. More particularly, this invention relates to the direct separation of D-glucose from sucrose, or from invert sugar or from mixtures of equal parts of D-glucose and D-fructose by shaking with a ketone containing a small amount of water and in the presence of a cation exchange resin.

Cation exchange resins bearing a sulfonic acid group have been employed as catalysts for the condensation reactions of sugars with alcohols to give glycosides [J. Am. Chem. Soc., 74, 1501 (1952) and J. Chem Soc., 3051 (1952)]. Resins of this type have also been used for the hydrolysis of disaccharides, starch and methylated polysaccharides. The hydrolysis of sucrose by this means has been shown to proceed rapidly and quantitatively and the D-fructose may be isolated via calcium fructosate [Chemie u. Industrie, 68, 889–95 (1952)].

Condensation reactions between compounds containing the carbonyl group and sugars or sugar derivatives such as glycosides and sugar alchohols have also been catalysed by cation exchange resins. In particular D-fructose was found to give a high yield of 1,2-4,5-α-diisopropylidene D-fructopyranose. Under similar conditions D-glucose does not condense to any large extent with ketones.

It has now been discovered that when a suspension of finely divided sucrose and a cation exchange resin in a ketone containing a small amount of water is stirred at room temperature, simultaneous hydrolysis of the sucrose and condensation of the derived fructose with the ketone take place with the formation of a clear solution and soon thereafter crystalline D-glucose begins to separate out producing a nearly quantitative yield. Crystalline D-fructose may then be regenerated from the supernatant solution which contains principally the diisopropylidene derivative of fructose. Similarly, D-glucose can be separated from invert sugar or a simple mixture of D-glucose and D-fructose.

It is the principal object of this invention to provide a method for the separation of D-glucose and D-fructose from sucrose or invert sugar.

Another object of this invention is to provide a method of separating D-glucose and D-fructose from suspensions of sucrose or invert sugar and a cation exchange resin in a ketone containing a small amount of water.

Other objects of the invention will become apparent as the description proceeds.

To the accomplishment of the foregoing and related ends, this invention then comprises the features hereinafter fully described and particularly pointed out in the claims; the following description setting forth in detail certain illustrative embodiments of the invention; these being indicative, however, of but a few of the various ways in which the principles of the invention may be employed.

Broadly stated the invention comprises a process of separating D-glucose and D-fructose from sucrose and invert sugar which includes the steps of forming a suspension of the sugar and a cation exchange resin in a ketone containing a small ratio of water, stirring this mixture at about room temperature until the suspension clears producing a clear solution and D-glucose begins to separate out, allowing the mixture to stand until the separation of D-glucose is substantially complete, withdrawing the supernatant liquid and recovering the D-glucose and regenerating crystalline D-fructose from the liquid.

Cation exchange materials in general may be used for carrying out the separation of the present invention. Particularly suited are the sulfonated type cation exchange materials such as sulfonated phenol-formaldehyde exchange resins, sulfonated polystyrene exchange resins, sulfonated coal and the like. These ion exchange materials are commercially available under the trademarks "Amberlite" from the Rohm and Haas Company, "Dowex" from the Dow Chemical Company, "Permutit Q" and "Zeo-Karb" from the Permutit Company, and others. The cation exchange materials are used in the state in which the exchangeable ions are hydrogen ions. They may be brought to this state by treatment with a dilute solution of acid in the conventional manner.

The separation reaction is carried out by suspending the sugar in an aqueous ketone system. The ion exchange material is used in an amount ranging between about ½ and 1½ times by weight of the sugar, preferably about the same weight. Sufficient volume of ketone is employed to form a light fluid suspension which may be kept gently agitated during the course of the reaction. At the same time, for practical reasons, a large excess of ketone is to be avoided. Based upon weight and assuming an average density of about 0.8 g./ml. it has been found that when the ketone is present in amount from about 5 to 15 times the combined weight of the sugar and ion exchange material a satisfactory easily agitated suspension is formed.

For convenience it is desired to carry out the separation at room temperature. Somewhat lower temperatures may be used but the reaction time is correspondingly lengthened. While somewhat higher temperatures may likewise be used it is preferred that they should be sufficiently below the boiling point of the ketone or the water (whichever is lower) that the separation reaction may be carried out under normal atmospheric conditions. The water is present in an amount ranging from about 2 to 8 percent by volume of the ketone, preferably in an amount of about 5 percent by volume.

Although acetone is the preferred ketone for carrying out the separation reaction of this invention, the invention is not limited to the use of any specific ketone. In addition to acetone such other readily available ketones as methyl ethyl ketone, diethyl ketone, cyclopentanone, cyclohexanone, methyl amyl ketone, methyl hexyl ketone, methyl isobutyl ketone and the like may be used.

The sugar, ion exchange catalyst, water and ketone may be admixed in any order although in some instances it may be more convenient to first dissolve the sugar in the water before adding it to the ketone. The resulting mixture is a cloudy suspension which is then stirred or shaken to maintain gentle agitation throughout the course of the separation reaction. All of the sugar will become dissolved and the suspension will clear in from about ½ to 3 days and crystalline glucose will appear after from about 1 to 4 days. The crystallization will be substantially complete after from 2 to 6 days. That is, if the suspension clears after about ½ day and glucose begins to crystallize after 1 day the crystallization may be complete after 2 days. On the other hand, if the suspension does not clear for up to 3 days and crystallization does not begin until 4 days it may be 6 days before crystallization is substantially complete.

After D-glucose no longer crystallizes out of the liquid, the glucose and the catalyst are filtered, washed with ketone, dried and separated. The $\alpha$-diisopropylidene-D-fructose which is produced in the separation reaction may be extracted from the aqueous ketone filtrate, preferably after concentration in vacuo, with benzene and recrystallized from petroleum ether. D-fructose may then be recovered from the extracted aqueous ketone filtrate. The extracted filtrate is concentrated in vacuo to remove the water and is then diluted with ethanol and cooled to about 5° C. at which temperature the D-fructose may be induced to crystallize by seeding.

Alternatively, the fructose may be regenerated from the aqueous ketone filtrate remaining after separation of the glucose and catalyst by concentrating the filtrate, hydrolyzing the concentrate with a mineral acid and neutralizing. Thereafter the hydrolysate is concentrated and dissolved in hot absolute ethanol. Upon cooling D-fructose crystallizes.

The invention is further illustrated, but not limited, by the following examples. The cation exchange material used in these examples were regenerated with 1 N hydrochloric acid, washed thoroughly with distilled water by decantation to remove all traces of mineral acid and finally washed several times with absolute alcohol and dried at room temperature in vacuo. In no instance was any trace of mineral acid detected in the reaction mixtures after removal of the exchange material.

EXAMPLE I

Separation of D-glucose from invert sugar

Invert sugar was initially prepared by hydrolysis of sucrose by heating a solution containing 20 grams of sucrose in 100 ml. of 0.1 N sulfuric acid for one hour at 90° C. on a water bath. While still hot this solution was neutralized with barium carbonate and thereafter was treated with charcoal to facilitate removal of barium sulfate and then filtered. The solvent was distilled in vacuo producing a colorless sirup of invert sugar. This sirup was dissolved in 20 ml. of water and shaken at room temperature with 400 ml. of acetone in which was suspended 20 grams of a commercial sulfonated phenol-formaldehyde ion exchange resin ("Amberlite IR-120"). After one day the mixture was clear and D-glucose had commenced to separate. Crystallization appeared to be complete after four days. After seven days the glucose and resin were filtered off, washed with acetone and dried in air. The yield of D-glucose (11.4 grams) was nearly quantitative.

EXAMPLE II

Separation of D-glucose from sucrose

Fifty grams of sucrose and 50 grams of a commercial sulfonated phenol-formaldehyde cation exchange resin ("Amberlite IR-120") were suspended in a mixture consisting of 1000 ml. of acetone and 60 ml. of water and the mixture was stirred gently at room temperature. The following changes in the appearance of the reaction mixture were noted: (1) after 14 hours all of the crystalline sucrose had dissolved and the solution was clear; (2) after 24 hours crystalline D-glucose appeared and (3) after 72 hours crystallization appeared to be complete. The reaction mixture was filtered and the D-glucose and resin washed thoroughly with acetone and dried at room temperature. The weight of D-glucose amounted to 25.6 grams. Without recrystallization the D-glucose so obtained showed $[\alpha]_D^{22}+44.1°$ equilibrium value in water (c., 4.3) and M. P. 130–146° C. After one recrystallization the D-glucose showed $[\alpha]_D^{22}+51.3°$ equilibrium value in water (c., 1.0) and M. P. 143–146° C.

(Attempts to duplicate Examples I and II in the absence of ion exchange material met with no success. The glucose present in invert sugar will not crystallize from aqueous acetone in the absence of treatment with the exchange material nor will sucrose or invert sugar afford crystalline D-glucose when mineral acid is substituted for the exchange material.)

EXAMPLE III

Separation of D-glucose from sucrose

A suspension of 50 grams of dry powdered sucrose and 50 grams of a commercial sulfonated phenolformaldehyde cation exchange resin in 1000 ml. of acetone containing 60 ml. of water was stirred at room temperature for seven days. After three days all of the suspended sucrose was dissolved; after four days crystalline glucose appeared and after six days there appeared to be no further increase in the amount of glucose. The resulting mixture of glucose and resin was filtered, washed twice with 200 ml. of acetone and dried at room temperature. The weight of glucose amounted to 26.2 grams. The yield was 91 percent assuming that the product is glucose-monohydrate or 99.8 percent assuming it to be anhydrous glucose. The melting point of the D-glucose (130–146° C.) was between that anhydrous glucose and its monohydrate. It showed $[\alpha]_D^{22}+44°$ equilibrium value in water (c., 4.3).

EXAMPLE IV

Regeneration of D-fructose

The sirup (22.8 grams) derived from the acetone supernatant solution following the separation of D-glucose from 50 grams of sucrose according to the procedure of Example II was hydrolyzed directly with 220 ml. of 0.01 N sulfuric acid at 90° C. The solution showed the following change in rotation during hydrolysis: Initial value (1 dm. tube): −2.42°; 6 hours: −4.58°; 12 hours: −4.87° (constant value). The hydrolysate was neutralized by passing it over a commercial anion exchange resin ("Duolite A–4" sold by the Chemical Process Company) and was concentrated in vacuo to a sirup. This sirup was dissolved in hot absolute ethanol and upon cooling crystalline D-fructose separated. It showed $[\alpha]_D^{23}-87°$ equilibrium value in water (c., 3.5), M. P. 104–107° C.

EXAMPLE V

Regeneration of D-fructose

The aqueous acetone filtrate from Example III was concentrated in vacuo to a thin syrup and extracted three times with benzene to recover $\alpha$-diisopropylidene-D-fructose. The sirup remaining after the benzene extraction was concentrated in vacuo to remove water and diluted with ethanol. Upon nucleation with fructose after cooling to 5° C. crystalline fructose was slowly deposited.

As many apparently widely differing embodiments of this invention may be made without departing from the spirit and scope thereof, it is to be understood that we do not limit ourselves specifically to the embodiments disclosed herein.

We claim:

1. A method of separating D-glucose from sucrose and invert sugar which comprises suspending a sugar selected from the group consisting of sucrose and invert sugar in an aqueous ketone system in the presence of a cation exchange material in the hydrogen cycle and gently agitating until crystalline D-glucose separates out, said ion exchange material being present in an amount from about ½ to 1½ times the weight of the sugar, said ketone being present in an amount from about 5 to 15 times the combined weight of the sugar and exchange material and said aqueous ketone system containing from about 2 to 8 percent by volume of water.

2. A method of separating D-glucose from sucrose and invert sugar which comprises suspending a sugar selected from the group consisting of sucrose and invert sugar and from about ½ to 1½ times its weight of a sulfonated type cation exchange material in the hydrogen cycle, as a catalyst, in a ketone, said ketone being present in an amount from about 5 to 15 times the combined weight of the sugar and the catalyst and containing from about 2 to 8 percent by volume of water, gently agitating said suspension at room temperature for from about two to six days until crystalline D-glucose separates out.

3. The method according to claim 2 further characterized in that the ketone is acetone.

4. A method of separating D-glucose and D-fructose from sucrose and invert sugar which comprises suspending a sugar selected from the group consisting of sucrose and invert sugar in an aqueous ketone system in the presence of a cation exchange material in the hydrogen cycle and gently agitating until D-glucose crystallizes out, separating said glucose and cation exchange material from said ketone and from each other and then regenerating D-fructose from the aqueous ketone residue, said ion exchange material being present in an amount from about ½ to 1½ times the weight of the sugar, said ketone being present in an amount from about 5 to 15 times the combined weight of the sugar and exchange material and said aqueous ketone system containing from about 2 to 8 percent by volume of water.

5. A method of separating D-glucose from sucrose and invert sugar which comprises suspending a sugar selected from the group consisting of sucrose and invert sugar and from about ½ to 1½ times its weight of a sulfonated type cation exchange material in the hydrogen cycle, as a catalyst, in a ketone, said ketone being present in an amount from about 5 to 15 times the combined weight of the sugar and the catalyst and containing from about 2 to 8 percent by volume of water, gently agitating said suspension at room temperature for from about two to six days until D-glucose crystallizes out, separating said glucose and catalyst from the ketone and from each other and then regenerating D-fructose from the aqueous ketone residue.

6. The method according to claim 5 further characterized in that the ketone is acetone.

References Cited in the file of this patent
UNITED STATES PATENTS

| | | |
|---|---|---|
| 2,487,121 | Fetzer | Nov. 8, 1949 |
| 2,534,694 | Blann | Dec. 19, 1950 |
| 2,592,509 | Block | Apr. 8, 1952 |

OTHER REFERENCES

Armstrong: The Carbohydrates and the Glucosides, N. Y., 1924, page 24.

Sussman: Ind. and Eng. Chem., December 1946, pp. 1228–1230.